(No Model.)
J. J. ALBRIGHT.
SLIDING GATE.
No. 374,647. Patented Dec. 13, 1887.
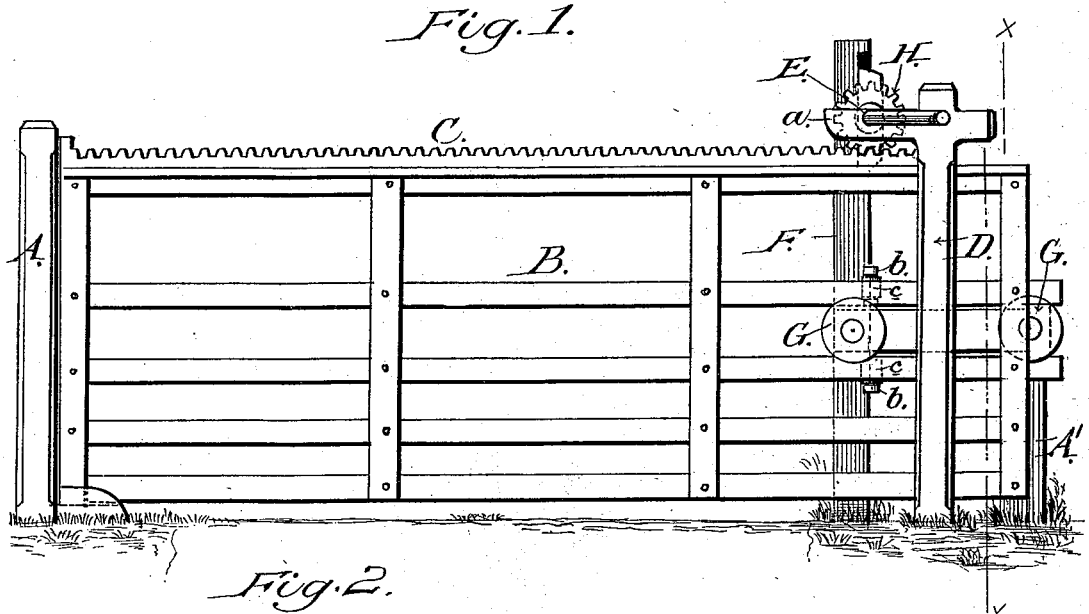
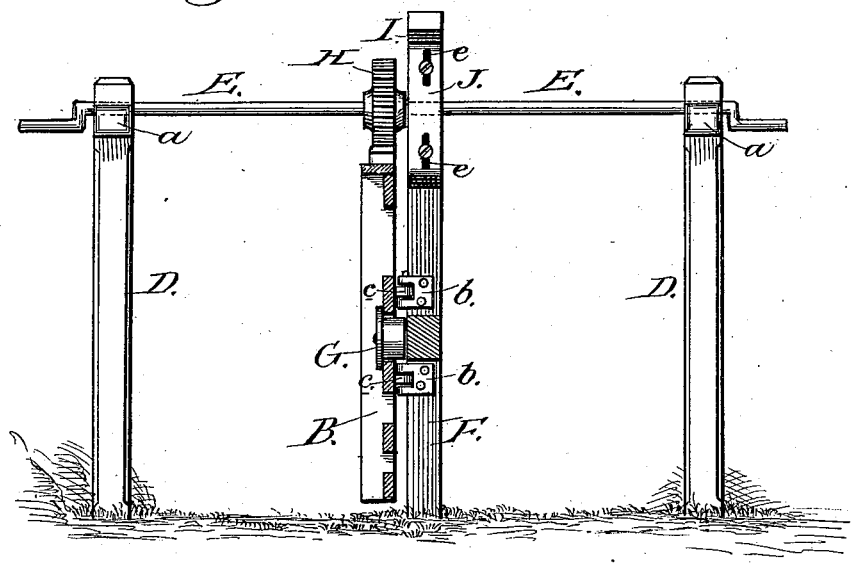
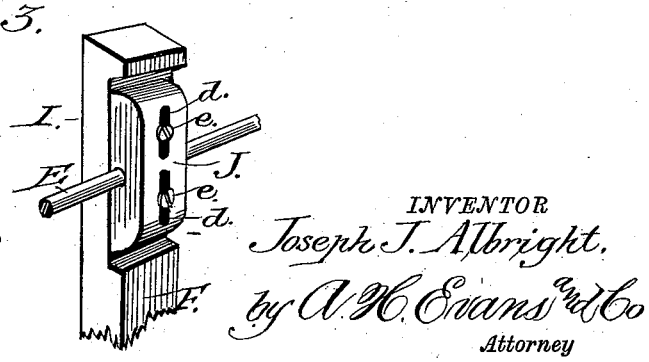
WITNESSES
T. Watter Fowler,
W. H. Patterson
INVENTOR
Joseph J. Albright,
by A. H. Evans and Co
Attorney

UNITED STATES PATENT OFFICE.

JOSEPH J. ALBRIGHT, OF FOSTORIA, OHIO.

SLIDING GATE.

SPECIFICATION forming part of Letters Patent No. 374,647, dated December 13, 1887.

Application filed September 15, 1887. Serial No. 249,779. (No model.)

*To all whom it may concern:*

Be it known that I, JOSEPH J. ALBRIGHT, a citizen of the United States, residing at Fostoria, in the county of Seneca and State of Ohio, have invented certain new and useful Improvements in Sliding Gates, of which the following is a full, clear, and exact description, reference being had to the accompanying drawings, forming part of this specification, in which—

Figure 1 represents a side elevation of a sliding gate embodying my invention. Fig. 2 is a transverse section of the same on the line X X of Fig. 1. Fig. 3 is a detail sectional view of the adjustable box or bearing through which the crank-shaft passes.

My invention relates to sliding gates; and it consists in the combination and construction of parts constituting the improved gate, hereinafter described and claimed.

To enable others skilled in the art to make and use my invention, I will describe its construction and indicate the manner in which I carry the same out.

In the said drawings, A A' represent the usual end posts, and B a sliding gate of any well-known construction, having secured to its upper rail and extending nearly or quite the entire length thereof a toothed rack, C, which is engaged by a pinion to cause the opening or closing of the gate, as I will hereinafter disclose.

On each side of the gate and at a suitable distance therefrom are fixed standards or posts D, having arms $a$ projecting at right angles and provided with journals or boxes for the ends of a transverse crank-shaft, E, the extremities of which terminate in handles or cranks to facilitate the operation of the gate.

By providing the posts D with the arms $a$ the crank-shaft is brought into a position where it may be readily operated by a person in a vehicle to move the gate without any danger of the hubs of said vehicle coming in contact with the posts.

Alongside of the gate and interposed between the posts D is another standard or post, F, to which and to one of the end posts, A', are suitably journaled flanged wheels G, which engage the rails of the gate and guide the latter in its movement. These wheels G may be flanged on both sides, if desired; but I prefer to construct them with but one flange, as shown, and suitably secure in brackets $b$ on the post F small anti-friction rollers $c$, which, bearing against the sides of the rails, insure a free sliding movement to the gate.

The shaft E is provided at its center with a pinion, H, adapted to engage the rack C to open and close the gate, and on the post F contiguous to said wheel is mounted an adjustable box or bearing, I, which sustains the center of said shaft. This box or bearing is seated in a mortise or opening in the post F, and consists of a block, J, bored laterally to receive the crank-shaft, and provided with elongated slots $d$, through which screws or bolts $e$ pass into the post F. By thus constructing said box, it will be observed, the same will yield vertically to permit the pinion to relieve itself should ice form on the rack or any other foreign substance clog the teeth thereon or obstruct the working of the pinion.

By reason of the above construction I am permitted to form a gate that is simple in its nature, positive in its operation, and not liable to injury or derangement in cold weather.

I am aware that side and main posts for gates have been provided with vertically-adjustable bearings. I therefore do not broadly claim such a bearing as my invention.

Having thus described my invention, what I claim as new, and desire to secure by Letters Patent, is—

1. The combination, with a gate having a rack upon its upper surface, of a post contiguous to said gate, having a mortise or recess at its top, a vertically-yielding block seated in said recess, a shaft passing through said block, and a pinion on said shaft engaging said rack, substantially as described.

2. The gate having the rack C, the end posts, and the side posts, D, in combination with guide-wheels for said gate, an intermediate post contiguous to the gate, having a mortise or opening at its top, a vertically-yielding slotted block or bearing secured thereto, a transverse shaft passing through said block or bearing, and a pinion on said shaft engaging the rack on the gate, substantially as herein described.

JOSEPH J. ALBRIGHT.

Witnesses:
JOHN A. BRADNER,
J. D. SNYDER.